H. A. DULINSKY.
COUPLING.
APPLICATION FILED JULY 27, 1907. RENEWED MAR. 2, 1909.

930,162.  Patented Aug. 3, 1909.

Witnesses

Inventor
Henry A. Dulinsky,
By Dean Swift
Attorney

UNITED STATES PATENT OFFICE.

HENRY A. DULINSKY, OF MUNCIE, INDIANA.

COUPLING.

No. 930,162.  Specification of Letters Patent.  Patented Aug. 3, 1909.

Application filed July 27, 1907, Serial No. 385,836. Renewed March 2, 1909. Serial No. 480,971.

*To all whom it may concern:*

Be it known that I, HENRY A. DULINSKY, a citizen of the United States, residing at Muncie, in the county of Delaware and State of Indiana, have invented certain new and useful Improvements in Couplings, of which the following is a specification, reference being had therein to the accompanying drawing.

This invention pertains to a new and useful coupling, designed for the purpose of clamping the ends of surface line rods, or rods of similar character, and the essential object thereof is to provide a device of this nature which is comparatively simple and inexpensive to manufacture.

This invention aims as a further object to provide a coupling, comprising a metallic body portion having in one of its faces a longitudinal semi-circular groove, in which are received the ends of the surface line rods, which also extend through the apertured bolts, which are positioned within the apertures, passing through the body of the coupling and at right angles to the groove; these bolts are held from displacement by any suitable means, preferably, such as shown.

This invention comprises further objects and combinations of elements which will be hereinafter more fully described, shown in the accompanying drawings, and the novel features thereof will be pointed out by the appended claim.

To obtain a full and correct understanding of the details of construction, combinations of features, elements and advantages reference is to be had to the hereinafter set forth description and the accompanying drawings in connection therewith, wherein—

Figure 1:
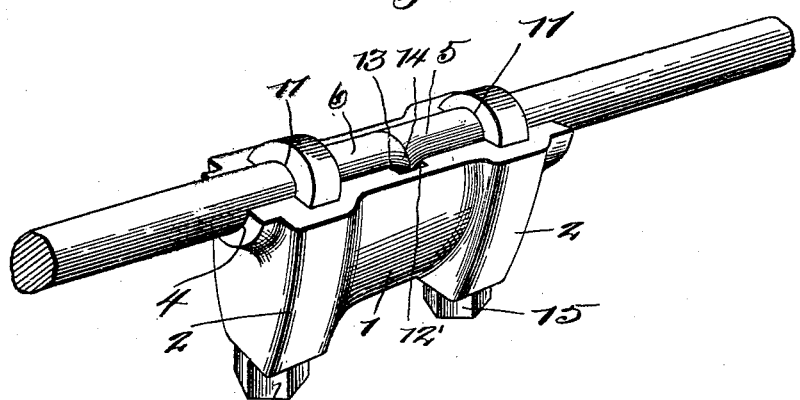
Figure 2:
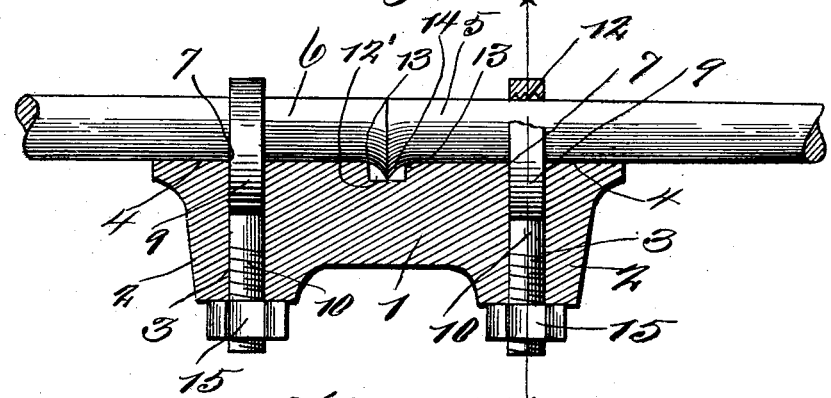
Figure 3:
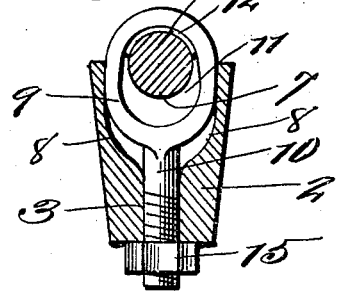

Figure 1 is a perspective view of the coupling, showing the ends of a surface line rod joined together by the same. Fig. 2 is a longitudinal section therethrough, illustrating a recess in the center of the body of the coupling. Fig. 3 is a cross section on line 3—3 of Fig. 2, illustrating more clearly the elliptical-shaped aperture, formed in the body of the bolt.

Making renewed reference to the accompanying drawings, wherein similar reference characters indicate corresponding parts in the several illustrations by figures, 1 designates the body of the coupling, having formed therewith, two hollow enlargements 2, through which apertures 3 extend, which apertures are laterally positioned to the longitudinal plane of the coupling, as clearly shown in the drawings. Upon the upper face of the coupling, is formed a semi-circular longitudinal groove 4, in which are received, the ends 5 and 6 of the surface line rod; this groove prevents lateral displacement of the ends of said rod as will be clearly manifest.

The apertures 3 merge into the semi-circular longitudinal groove as at 7, and at this point, they are slightly enlarged as at 8, clearly shown in Fig. 3 of the accompanying drawings. This enlargement, as shown at 8, is for the purpose of receiving the enlargement 9 of the bolts 10, so as to prevent turning of the same. These bolts 10, are provided with elliptical-shaped apertures 11, upon the in-circumference of which are formed serrations 12, for the purpose of biting into the circumference of the surface line rod, so as to prevent disconnection thereof or outward displacement.

Formed upon the same face, of the coupling, with the longitudinal groove, is a recess 12', the corners of which, as at 13, are designed to have a cam action upon beveled lips 14 formed at each end of the surface line rod, that is, when the nuts 15 are securely tightened for the purpose of drawing the bolts farther within the apertures 3 so as to make a close connection between the surface line rods, as will be clearly evident on thorough examination of the drawings.

It is to be understood that various changes and modifications may be employed in the construction and embodiment thereof, combinations of features, and elements, without in any way departing from the spirit and scope of the invention covered by the claims thereof; it being understood that whatever variations or modifications are employed must fall within the scope of the appended claim.

From the foregoing, the essential features, elements and the operation of the device, together with the simplicity thereof, will be clearly apparent, and when manufactured in accordance with the invention, an inexpensive market will be easily obtained therefor.

Having thus described the invention, what is claimed by the protection of Letters-Patent, is:

A coupling of the character described, comprising an oblong member having extending along its upper surface an upwardly facing axial groove, also lateral vertical recesses transversely intersecting said groove near the end of said member and having downward aperture extensions, said member also having an additional recess or depression intersecting said groove at a point, about centrally thereof, and coupling bolts having oval eyes at their upper ends adapted to receive the line-surface rod-sections, the threaded portions of said bolts being received by said apertures extending downward, said additional central recess receiving the beveled cam-lips at the meeting or abutting ends of said rod sections, and means for the retention of said bolts in place.

In testimony whereof I hereunto affix my signature in presence of two witnesses.

HENRY A. DULINSKY.

Witnesses:
CHARLES E. RUGER,
CHARLINE HINKLE.